US010091643B2

(12) United States Patent
Shin et al.

(10) Patent No.: US 10,091,643 B2
(45) Date of Patent: Oct. 2, 2018

(54) METHOD AND APPARATUS FOR DISPLAYING ASSOCIATED INFORMATION IN ELECTRONIC DEVICE

(71) Applicant: Samsung Electronics Co., Ltd., Gyeonggi-do (KR)

(72) Inventors: Sangwook Shin, Seoul (KR); Sungwoon Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/026,782

(22) PCT Filed: Oct. 7, 2014

(86) PCT No.: PCT/KR2014/009446
§ 371 (c)(1),
(2) Date: Apr. 1, 2016

(87) PCT Pub. No.: WO2015/053541
PCT Pub. Date: Apr. 16, 2015

(65) Prior Publication Data
US 2016/0255494 A1 Sep. 1, 2016

(30) Foreign Application Priority Data
Oct. 7, 2013 (KR) .......... 10-2013-0119246

(51) Int. Cl.
H04M 3/42 (2006.01)
H04W 8/18 (2009.01)
(Continued)

(52) U.S. Cl.
CPC ...... H04W 8/183 (2013.01); G06F 17/30997 (2013.01); G06Q 10/1093 (2013.01);
(Continued)

(58) Field of Classification Search
CPC .. G06Q 10/1093; G06Q 50/01; G06Q 10/107; G06F 17/30997; H04W 8/183;
(Continued)

(56) References Cited

U.S. PATENT DOCUMENTS 8,446,455 B2 * 5/2013 Lian .......................... H04N 7/15
348/14.08
8,731,612 B2 * 5/2014 Mun ................. H04M 1/72572
348/14.01
(Continued)

FOREIGN PATENT DOCUMENTS

KR 1020060097463 9/2006
KR 1020130070863 6/2013
(Continued)

OTHER PUBLICATIONS

PCT/ISA/210 Search Report issued on PCT/KR2014/009446 (pp. 3).
PCT/ISA/237 Written Opinion issued on PCT/KR2014/009446 (pp. 7).

Primary Examiner — Mong-Thuy Tran
(74) Attorney, Agent, or Firm — The Farrell Law Firm, P.C.

(57) ABSTRACT

Provided is a method for displaying counterpart-associated information in an electronic device. The method for displaying associated information in an electronic device may include: finding, when a function associated with a specific counterpart is executed, information that is stored so as to be mapped with identification information of the counterpart; and displaying at least of the found information and an item for the found information. The found information may include at least one of communication log information for a video or voice call with the counterpart, schedule or memo information related to the counterpart, voice information
(Continued)

collected during a call with the counterpart, and social content information related to the counterpart.

17 Claims, 12 Drawing Sheets

(51) Int. Cl.
| | |
|---|---|
| G06F 17/30 | (2006.01) |
| G06Q 50/00 | (2012.01) |
| H04L 12/58 | (2006.01) |
| H04M 1/57 | (2006.01) |
| H04M 1/725 | (2006.01) |
| H04N 7/14 | (2006.01) |
| H04N 7/15 | (2006.01) |
| G06Q 10/10 | (2012.01) |
| G10L 15/08 | (2006.01) |
| G10L 15/26 | (2006.01) |
| H04M 7/00 | (2006.01) |

(52) U.S. Cl.
CPC ............ *G06Q 50/01* (2013.01); *H04L 51/16* (2013.01); *H04L 51/32* (2013.01); *H04M 1/576* (2013.01); *H04M 1/72552* (2013.01); *H04M 1/72597* (2013.01); *H04M 3/42042* (2013.01); *H04M 3/42093* (2013.01); *H04N 7/147* (2013.01); *H04N 7/155* (2013.01); *G06Q 10/107* (2013.01); *G09G 2370/022* (2013.01); *G10L 15/26* (2013.01); *G10L 2015/088* (2013.01); *H04M 7/0036* (2013.01); *H04M 2201/50* (2013.01); *H04M 2203/551* (2013.01)

(58) Field of Classification Search
CPC ...... H04W 68/005; G06C 50/01; G10L 15/08; G10L 15/265; G10L 15/26; G10L 2015/088; H04L 51/16; H04L 51/32; H04M 1/576; H04M 1/72552; H04M 1/72597; H04M 3/42042; H04M 3/42093; H04M 7/0036; H04M 2201/50; H04M 2203/551; H04N 7/147; H04N 7/155; G09G 2370/022
USPC ........................................................ 455/415
See application file for complete search history.

(56) References Cited

U.S. PATENT DOCUMENTS

| | | | |
|---|---|---|---|
| 2007/0167136 A1* | 7/2007 | Groth ................... | G06Q 10/109 455/41.2 |
| 2007/0293206 A1* | 12/2007 | Lund ................. | H04M 3/42068 455/415 |
| 2008/0154697 A1* | 6/2008 | Guday ................... | G06Q 10/10 455/414.1 |
| 2010/0083137 A1* | 4/2010 | Shin ..................... | H04L 12/1822 715/756 |
| 2011/0044438 A1* | 2/2011 | Wang ..................... | H04W 4/206 379/93.02 |
| 2012/0052817 A1 | 3/2012 | Lee et al. | |
| 2013/0155099 A1* | 6/2013 | Ha ..................... | H04M 1/72522 345/619 |
| 2014/0115068 A1* | 4/2014 | Kurupacheril ....... | H04L 12/1813 709/206 |
| 2014/0148135 A1* | 5/2014 | Haney ..................... | H04W 4/08 455/414.1 |
| 2014/0222169 A1* | 8/2014 | Kazuno ................... | H04Q 9/00 700/17 |
| 2014/0313280 A1* | 10/2014 | Takuno ............... | H04L 65/1069 348/14.08 |

FOREIGN PATENT DOCUMENTS

| | | |
|---|---|---|
| WO | WO 2012030001 | 3/2012 |
| WO | WO 2012134027 | 10/2012 |
| WO | WO 2013002569 | 1/2013 |
| WO | WO 2013089532 | 6/2013 |

* cited by examiner

METHOD AND APPARATUS FOR DISPLAYING ASSOCIATED INFORMATION IN ELECTRONIC DEVICE

TECHNICAL FIELD

The present invention relates to a method and apparatus for efficiently displaying counterpart-associated information in an electronic device.

BACKGROUND ART

With recent advances in communication technology, electronic devices such as smartphones and tablet computers have been widely popularized. In particular, mobile terminals are used in various areas thanks to ease of use and high portability. To meet changing user needs, various new functions have been added to mobile terminals in addition to call handling or text messaging. Various schemes have also been developed to provide terminal users with necessary information in various forms anytime and anywhere. For example, recent messaging functions or instant messengers tend to present both sent messages and received messages on the same screen. This may increase efficiency of information presentation by successively displaying messages exchanged between parties.

However, in the case of a voice call or video call, only restrictive information, such as a phone number or an image of the counterpart, is provided on the screen. Hence, when history information related to the counterpart (e.g. messages and schedules) is needed during the call, the user is inconvenienced by having to browse through relevant history items in person.

Hence, it is necessary to develop a scheme that can provide the user with information about a specific counterpart in a continuous manner on demand during terminal operation by using information collected in association with the counterpart.

DISCLOSURE OF INVENTION

Technical Problem

The present invention has been made in view of the above problems. Accordingly, an aspect of the present invention is to provide a method and apparatus that enable an electronic device to collect and process information associated with counterparts during operation and to provide the user with information associated with a particular counterpart if necessary.

Solution to Problem

In accordance with an aspect of the present invention, there is provided a method for displaying associated information in an electronic device. The method may include: finding, when a function associated with a specific counterpart is executed, information that is stored so as to be mapped with identification information of the counterpart; and displaying at least of the found information and an item for the found information. Here, the found information may include at least one of communication log information for a video or voice call with the counterpart, schedule or memo information related to the counterpart, voice information collected during a call with the counterpart, and social content information related to the counterpart.

In accordance with another aspect of the present invention, there is provide an electronic device. The electronic device may include: a display unit to output a function processing screen of the electronic device and to display, when a function associated with a specific counterpart is executed, information found in relation to the counterpart; a control unit to control a process of collecting at least one of communication log information related to the counterpart, schedule or memo information related to the counterpart, voice information during a call with the counterpart, and social content information related to the counterpart, and displaying, when the function associated with the counterpart is executed, at least of information that is stored so as to be mapped with identification information of the counterpart and an item for the stored information on the display unit; and a storage unit to store information so that the information is mapped with the identification information of the counterpart.

Advantageous Effects of Invention

In a feature of the present invention, the mobile terminal may collect and process various information such as schedules, memos, call logs, messages, social content information and voice information related to individual counterparts enrolled therein during operation and provide information related to a specific counterpart in various forms on a user function screen. Hence, the user may secure continuity of information about a particular counterpart, utilize counterpart information in an efficient manner, and feel a sense of closeness with the counterpart. In addition, the user may readily examine counterpart information during usage of the electronic device (e.g. call, message or email writing) without having to directly browse memos and schedules related to a specific counterpart.

MODE FOR THE INVENTION

Figure 1:
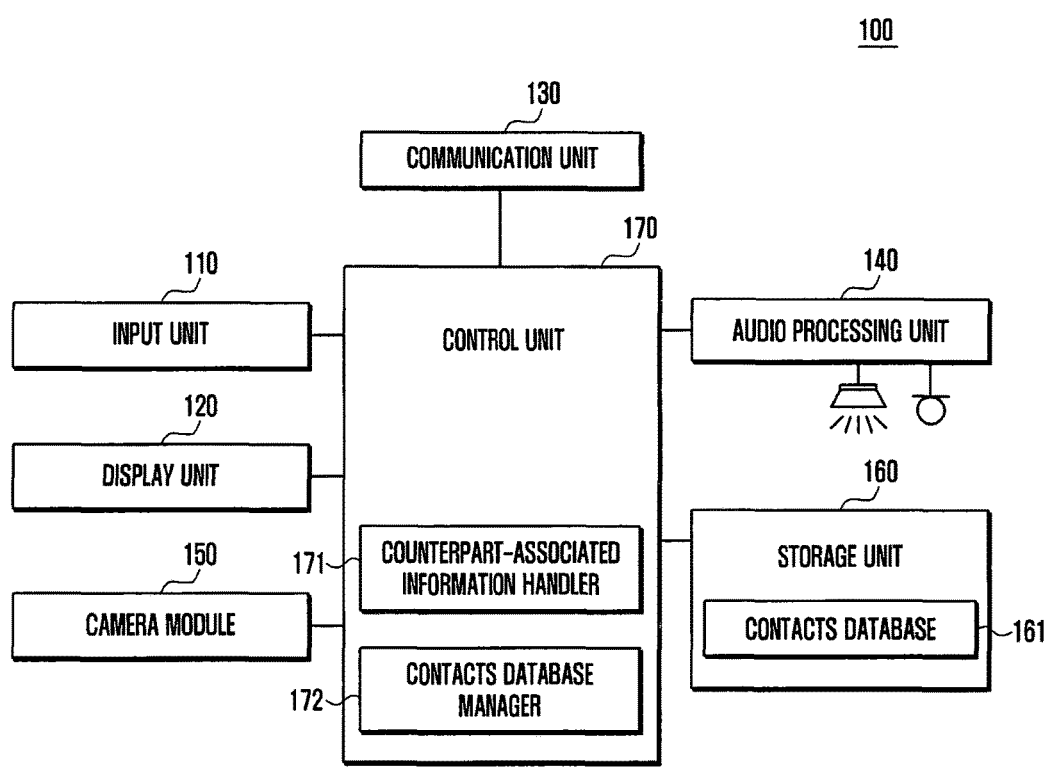
FIG. 1 is an overview block diagram of a mobile terminal according to according to an embodiment of the present invention.

Hereinafter, embodiments of the present invention are described in detail with reference to the accompanying drawings. The phraseology and terminology used herein is for the purpose of description and should not be regarded as limiting. It will be understood that terms should be interpreted as having a meaning that is consistent with their meaning in the context of the specification and relevant art.

The description of various embodiments is to be construed as exemplary only and does not describe every possible instance of the present invention. It should be apparent to those skilled in the art that the following description of various embodiments is provided for illustration purpose only and not for the purpose of limiting the present invention. In the drawings, some elements are exaggerated, omitted, or only outlined in brief, and thus may be not drawn to scale. The present invention is not limited by the relative sizes of objects and intervals between objects in the drawings.

Next, a description is given of an electronic device supporting a method and apparatus for displaying associated information. In various embodiments, the electronic device may be a mobile terminal or terminal such as a smartphone, tablet computer, mobile phone, video phone, e-book reader, wearable device, smart camera, or PDA.

FIG. 1 is an overview block diagram of a mobile terminal according to according to an embodiment of the present invention.

Referring to FIG. 1, the mobile terminal 100 may collect and process information related to counterparts enrolled in the contacts database and provide information associated with a specific counterpart on a user function screen during operation if necessary. In particular, the mobile terminal 100 may collect information associated with a specific counterpart, such as log information on communication with the counterpart, voice information recorded during a call with the counterpart, schedule and memo information associated with the counterpart, message information sent to or received from the counterpart, and social content information related to the counterpart. The mobile terminal 100 may compose pages to be output to a user function screen on the basis of various collected information and store the pages so that they are mapped with counterpart IDs (identification). In particular, when a screen having a counterpart ID (e.g. call handling screen, message composition screen, email writing screen) is output, the mobile terminal 100 may output at least one of a stored information page mapped with the counterpart ID and an information selection item.

To achieve this, the mobile terminal 100 may include an input unit 110, a display unit 120, a communication unit 130, an audio processing unit 140, a camera module 150, a storage unit 160, and a control unit 170.

The input unit 110 generates various input signals needed for user settings, information usage and voice input device control, and sends the generated input signals to the control unit 170. In response to such an input signal, the control unit 170 controls a function mapped with the input signal. When the display unit 120 is configured as a touchscreen composed of a touch panel and a display panel, the input unit 110 may generate an input signal needed for terminal operation through the touch panel.

The display unit 120 displays various function screens related to functions manipulating counterpart-associated information. The display unit 120 may convert video data from the control unit 170 into an analog signal and display the analog signal under the control of the control unit 170. The display unit 120 may provide various screens in the course of operating the mobile terminal 100. Under the control of the control unit 170, when a user function related to a counterpart terminal is activated, the display unit 120 may output a screen corresponding to the user function (e.g. call waiting screen, call connecting screen, message writing screen, or email writing screen).

When a user function related to a counterpart terminal is utilized, the display unit 120 may display at least one of a page containing counterpart-associated information and an information selection item together with a counterpart ID. Here, the counterpart ID refers to unique information assigned to another user of an external terminal. Counterpart IDs are assigned to users of external terminals enrolled in the mobile terminal 100 and may be generated by use of phone numbers, email accounts, SNS accounts, and user names. The user of the mobile terminal 100 may use counterpart IDs to identify a specific counterpart user, to make or receive a call, or to send a message or email.

Counterpart-associated information refers to information collected according to a preset rule in association with a particular counterpart enrolled in the mobile terminal. Counterpart-associated information may include log information on communication with a counterpart (e.g. video call log), schedule and memo information containing the corresponding counterpart ID, verbal expressions repeatedly mentioned during a call with the counterpart, message information sent to or received from the counterpart, and social content information related to the counterpart. The information selection item refers a menu linked with a page containing a piece of collected information, and the page is displayed when the menu item is activated. The information selection item may include icons linked with a video call log page, a memo/schedule information page, a message/social content page, and a voice information page. Counterpart-associated information of the present invention is not limited to the above information elements. Other types of information related to a specific counterpart may be collected, and the collected information may be used to compose an information page, which is linked with an information selection item. Screens provided on the display unit 120 are described in detail later with reference to the drawings.

The communication unit 130 performs communication with mobile communication networks via communication channels for a voice call, video call, and data call under the control of the control unit 170. The communication unit 130 may include a radio frequency (RF) transmitter for upconverting the frequency of a signal to be transmitted and amplifying the signal, and an RF receiver for low-noise amplifying a received signal and downconverting the frequency of the received signal. The communication unit 130 may include a mobile communication module, a wireless Internet module, and the like. The mobile communication module may send and receive radio signals to and from a base station and an external server. The radio signals may carry various types of data corresponding to a voice call, a video call, and a text or multimedia message. The wireless Internet module may be used for wirelessly accessing the Internet. Under the control of the control unit 170, the wireless Internet module may establish a communication channel to a website providing a social networking service (SNS). In the present invention, under the control of the control unit 170, the communication unit 130 may connect to a social networking server, download identification information of users having recently posted social content, and forward the identification information to the control unit 170. Then, the control unit 170 may compare the downloaded information with the contacts database and collect posting information related to a particular user from the social networking server.

The audio processing unit 140 converts audio data from the control unit 170 into an analog signal and sends the analog signal to a speaker SPK, and converts audio data like a voice signal from a microphone MIC into a digital signal and sends the digital signal to the control unit 170. The audio processing unit 140 may include a coder/decoder (codec). The codec may have a data codec for processing packet data and the like, and an audio codec for processing an audio signal such as a voice signal. The audio processing unit 140 converts a digital audio signal into an analog signal through the audio codec to reproduce the analog signal through the speaker SPK, and converts an analog audio signal from the microphone MIC into a digital audio signal through the audio codec to provide the digital audio signal to the control unit 170.

The camera module 150 provides an image by photographing a target object. The camera module 150 may include a camera sensor to convert an optical input signal into an electrical signal, an image signal processor to convert an analog image signal from the camera sensor into digital data, and a digital signal processor to apply image processing operations (e.g. scaling, noise removal, RCG signal conversion) on the digital data from the image signal processor in order to display the digital data on the display unit 120.

The storage unit 160 stores one or more applications needed to execute terminal functions, user data created by the user, messages exchanged with networks, and data generated by application execution. The storage unit 160 may include a program area and a data area.

The program area may store an operating system (OS) for booting the mobile terminal 100 and controlling the above components, and downloaded or installed applications. In particular, the program area may store algorithms for composing information pages containing counterpart-associated information, speech recognition, and information collection.

The data area is used to store user data generated from the usage of the mobile terminal 100. The data area may store data used or generated during execution of a speech recognition program. The data area may store various statistical models for speech recognition, speech recognition results of a speech recognition algorithm, screen composition information, and page composition information.

In particular, the data area may store a contacts database 161 and page information composed based on counterpart-associated information. The contacts database may store enrolled counterpart IDs such as phone numbers, email accounts, SNS accounts, and user names. The page information composed based on counterpart-associated information may be stored so that it is linked with the contacts database via counterpart IDs.

The control unit 170 controls the overall operation of the mobile terminal 100 and internal components thereof and performs data processing. The control unit 170 controls supply of power from the battery to the internal components. Upon power on, the control unit 170 controls booting of the mobile terminal 100 and executes various applications stored in the program area according to user settings for normal operation.

In particular, the control unit 170 may include a counterpart-associated information handler 171 and a contacts database manager 172.

The counterpart-associated information handler 171 may collect, according to a preset schedule or user input, video images or voice data during a voice call or video call with a specific counterpart, collect memo/schedule information in relation to the counterpart, or collect social content information related to the counterpart from SNS servers. To compose screens on the basis of the collected information, the counterpart-associated information handler 171 may compose information pages related to the counterpart and sends information on the information pages to the contacts database manager 172.

For example, according to a preset rule or user input during a video call, the counterpart-associated information handler 171 may collect image data of the counterpart and resize the collected image data to compose an image log page. Here, when multiple pieces of image data are present for a specific counterpart, the counterpart-associated information handler 171 may compose an image log page so that the pieces of image data are output in reverse chronological order of the collection time (most recent data first), and control image data display so that image data is output in chronological order according to user input.

During a voice call or video call, the counterpart-associated information handler 171 may recognize voice data from the microphone, extract keywords from the voice data, and converts those repeated keywords into text data using a speech-to-text (STT) function. The counterpart-associated information handler 171 may compose a voice keyword page by arranging the voice keywords in chronological order of the collection time.

The counterpart-associated information handler 171 may analyze schedule/memo data, collect schedules/memos containing a specific counterpart ID, and arrange the collected schedules/memos to compose a schedule/memo page.

The counterpart-associated information handler 171 may connect to an SNS server, examine account information of postings on the SNS server, collect posting information having an SNS account matching a counterpart ID stored in the contacts database, and compose a social content page for the corresponding counterpart on the basis of the collected posting information. During terminal operation, the counterpart-associated information handler 171 may periodically check whether social content of a particular counterpart is updated, and update the contents of the corresponding social content page accordingly.

The contacts database manager 172 may examine page information sent by the counterpart-associated information handler 171 and store a page so that the page is mapped with a corresponding counterpart ID. When a user function is activated in relation to a specific counterpart, the contacts database manager 172 may control the display unit 120 to output at least one stored page mapped with the corresponding counterpart ID.

When a screen having a counterpart ID (e.g. call handling screen, message writing screen, or email writing screen) is output according to user input or a preset schedule, the contacts database manager 172 may output at least one of a stored information page mapped with the counterpart ID and an information selection item.

Although possible variations according to the trend of digital convergence are too numerous to enumerate, the mobile terminal 100 may further include a unit comparable to the above-described units such as a GPS module. If necessary, one unit of the mobile terminal 100 may be removed or replaced with another unit.

Figure 2:
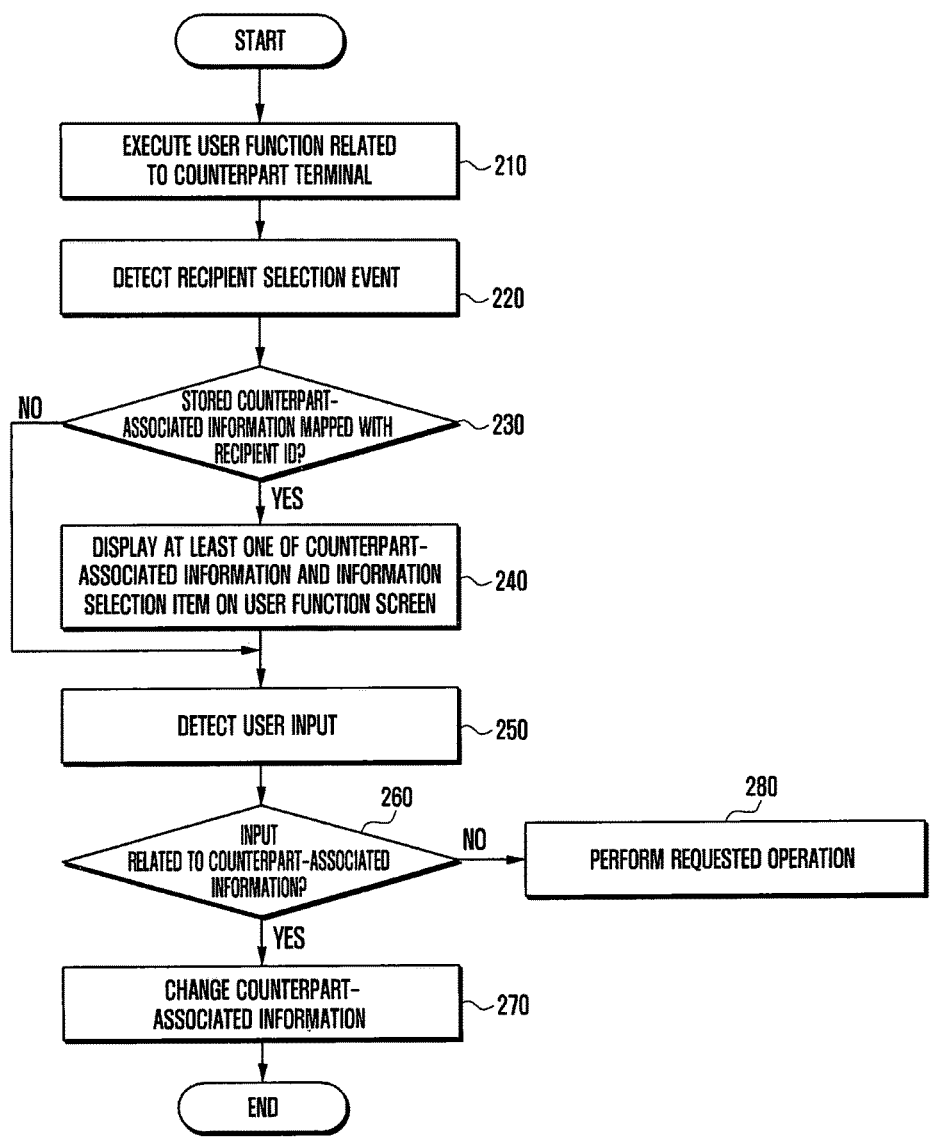
FIG. 2 is a flowchart illustrating a procedure for providing counterpart-associated information according to an embodiment of the present invention.

FIG. 2 is a flowchart illustrating a procedure for providing counterpart-associated information according to an embodiment of the present invention.

Referring to FIG. 2, at step 210, the mobile terminal 100 (of FIG. 1) executes a user function related to a counterpart terminal (or another person) according to a user request or preset schedule. For example, such a counterpart-associated user function may include placing a call to a person, receiving a call from a person, writing an email message to a recipient, reading an email message received from a sender, displaying an entry of the contacts in relation to a person, displaying an entry of the communication log in relation to a person, or displaying a posting of social content in relation to a person (SNS service). When the user function is activated, the mobile terminal 100 may display a corresponding screen on the display unit. For example, the mobile terminal 100 may display a screen requiring recipient information, such as a message writing screen, call handling screen, or email writing screen. Thereafter, the mobile terminal 100 may receive an input signal from the user and control the user function according to the input signal.

At step 220, the mobile terminal 100 detects occurrence of a recipient selection event. Specifically, when the user function is for call handling, the recipient selection event may correspond to selecting a counterpart from the call log or contacts list, entering a counterpart phone number via the keypad, or placing a call to a selected counterpart. When the user function is for message or email writing, the recipient selection event may correspond to entering a counterpart ID in the recipient field.

At step 230, the mobile terminal 100 checks presence of stored counterpart-associated information mapped with the recipient ID. For example, the mobile terminal 100 attempts to find stored page information mapped with a counterpart ID matching the recipient ID with reference to the contacts database in the storage unit.

If counterpart-associated information is found, at step 240, the mobile terminal 100 displays at least one of the counterpart-associated information and an information selection item on the user function screen. Here, at least one of a video call log page, a schedule/memo page, a voice keyword page, and a social content page may be displayed as counterpart-associated information.

At step 250, the mobile terminal 100 detects user input. At step 260, the mobile terminal determines whether the user input is related to counterpart-associated information. If the user input is unrelated to counterpart-associated information, at step 280, the mobile terminal 100 performs an operation according to the user input. For example, the mobile terminal 100 may create a text message or email message or attach a photograph for the user.

If the user input is related to counterpart-associated information, at step 270, the mobile terminal 100 may change the counterpart-associated information according to the user input. For example, in a state where video call log information related to the recipient is output, the user may wish to view schedule/memo information related to the recipient. When the schedule/memo information selection item is selected by the user, the mobile terminal 100 may output a schedule/memo information page on the screen.

Figure 3:
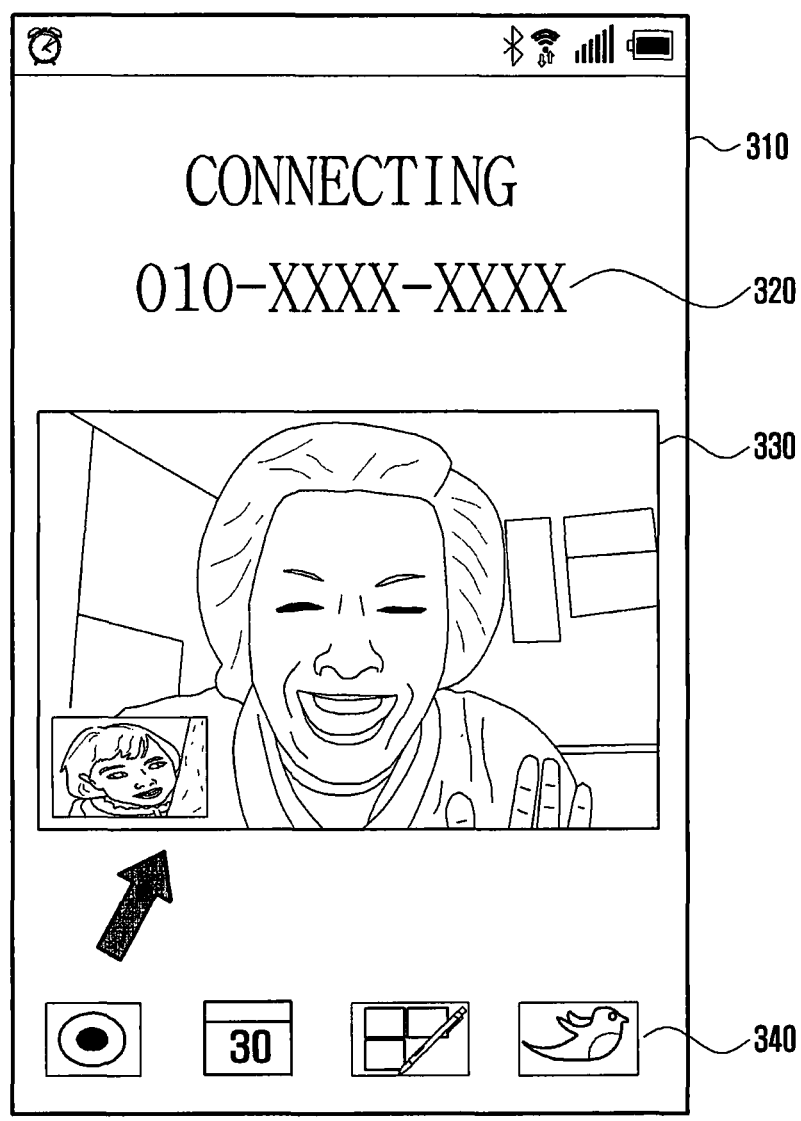
FIGS. 3 and 4 illustrate counterpart-associated information providing screens according to a first embodiment of the present invention.
Figure 4:
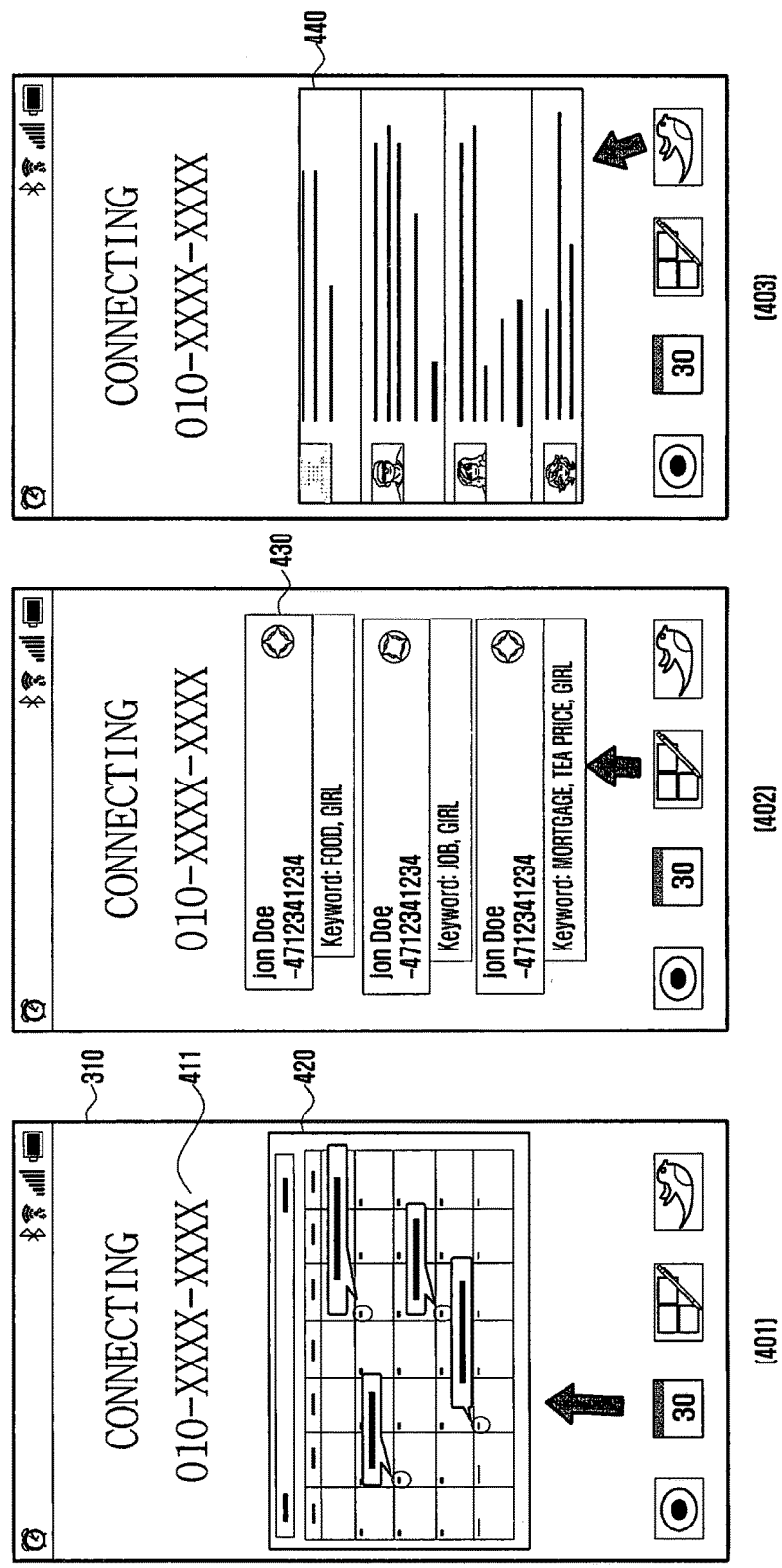

FIGS. 3 and 4 illustrate counterpart-associated information providing screens according to a first embodiment of the present invention.

As shown in FIG. 3, in the first embodiment, a call waiting screen 310 may be configured to output collected counterpart-associated information in a state waiting for establishment of a call to a counterpart ID. Here, the call waiting screen 310 may be output on the display unit 120 in a state waiting for a response signal after call placement to a specific counterpart terminal.

Specifically, the call waiting screen 310 may include a call-waiting indication, counterpart ID information 320, a counterpart information window 330, and information selection items 340.

The counterpart ID information 320 may include at least one of a counterpart name and a counterpart phone number. The counterpart information window 330 is a region in which a page containing counterpart-associated information mapped with the recipient ID is output. For example, in relation to a counterpart, the mobile terminal 100 may output, on the counterpart information window 330, at least one of a video log page composed based on video call log information, a schedule/memo page composed based on schedule/memo information, a voice keyword page composed based on keywords repeated in conversations during calls, a message/social content page composed based on exchanged messages or social content information. When the call waiting screen 310 is output, a video log page may be output first on the counterpart information window 330 by default. However, another page may be output first according to user settings.

Here, the video log page may be composed of video data extracted from the last video call with the counterpart. The schedule/memo page may be composed of schedule/memo data collected on a weekly or monthly basis. The a voice keyword page may be composed of recent voice data in chronological order of the collection time, and the social content page may be composed of recent social content data in chronological order of the collection time.

The information selection item 340 is a menu object linked with a page composed based on counterpart-associated information. In the drawing, a video log icon, schedule information icon, voice information icon, and social information icon are shown. When a page of another type is present in relation to counterpart-associated information, another icon for the page may be added as an information selection item.

The mobile terminal 100 may replace the page displayed on the counterpart information window 330 with another page according to a preset rule or user input. For example, during a state waiting for a response signal from the counterpart terminal, when the user selects an information selection item 340, a page linked with the information selection item 340 may be output on the counterpart information window 330. For instance, referring to FIG. 3, when the user wishes to check plans with to the counterpart while waiting for call establishment, the user may select the schedule icon on the screen. Then, as indicated by indicia 401 of FIG. 4, the mobile terminal 100 may output a schedule page, composed based on schedule items 420 collected in association with the counterpart ID 411, on the counterpart information window 410. Indicia 402 indicates output of a voice keyword page composed based on keywords 430 repeated in call conversions with the counterpart in response to user selection of the voice keyword icon. Indicia 403 indicates output of a social page composed based on exchanged social messages and social content 440 posted by the counterpart in response to user selection of the social icon.

In addition, the mobile terminal 100 may change details of the page displayed on the counterpart information window according to user input. For example, when the user wishes to view a video call image different from the current one on the counterpart information window, the user may enter a corresponding input signal to cause the mobile terminal 100 to output a video call image selected from among stored video call images on the counterpart information window.

Figure 5:
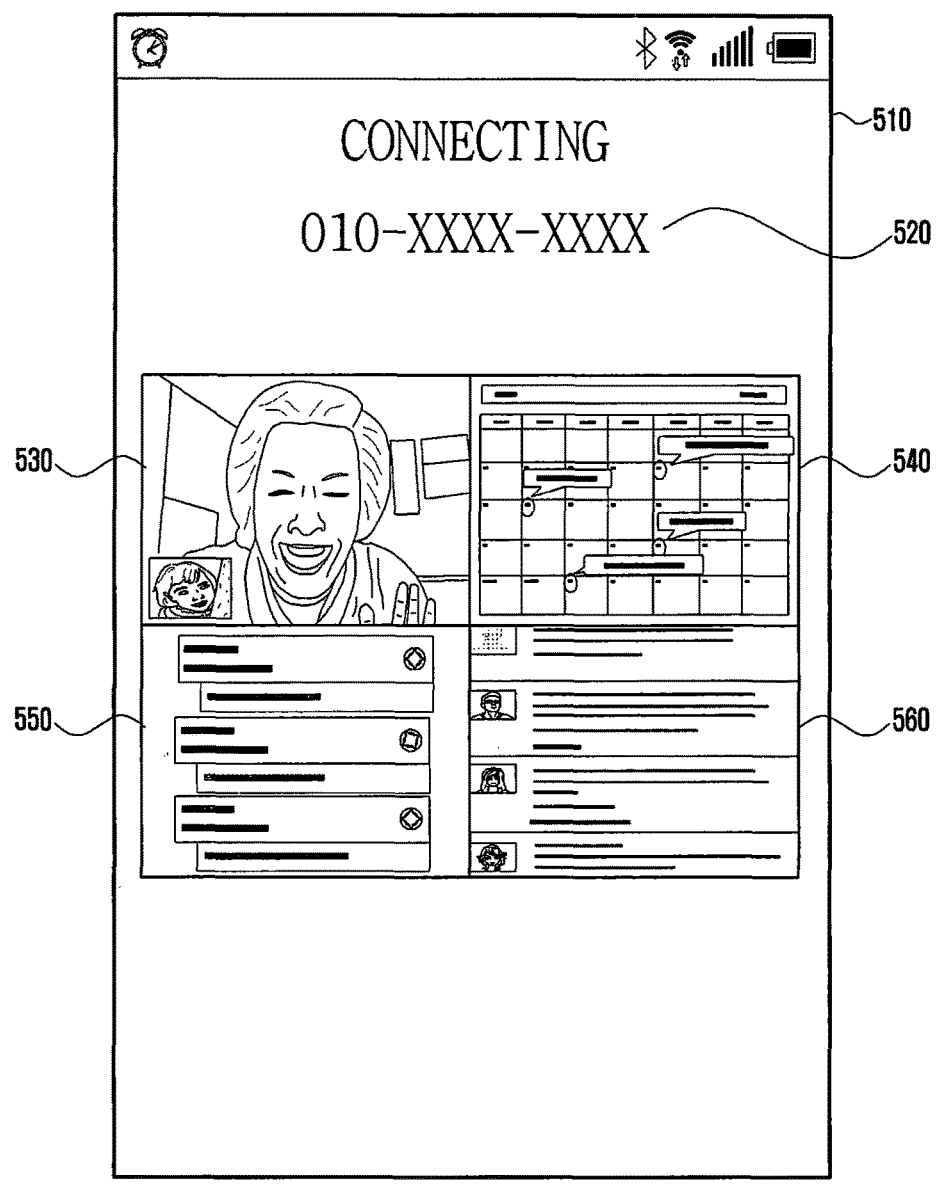
FIG. 5 illustrates a counterpart-associated information providing screen according to a second embodiment of the present invention.

FIG. 5 illustrates a counterpart-associated information providing screen according to a second embodiment of the present invention.

As shown in FIG. 5, in the second embodiment, a call waiting screen 510 may be configured to simultaneously output several pages composed based on information items associated with a counterpart ID 520. The mobile terminal 100 may output a video log page 530, a schedule page 540, a voice keyword page 550, and a social page 560 together on the counterpart information window of the call waiting screen 510. The mobile terminal 100 may split the counterpart information window of the call waiting screen 510 according to the number of composed pages for a counterpart ID. For example, when a voice keyword page and a social page are composed for a specific counterpart ID, the mobile terminal 100 may split the counterpart information window into two sections and output the voice keyword page and the social page in the two sections.

Figure 6:
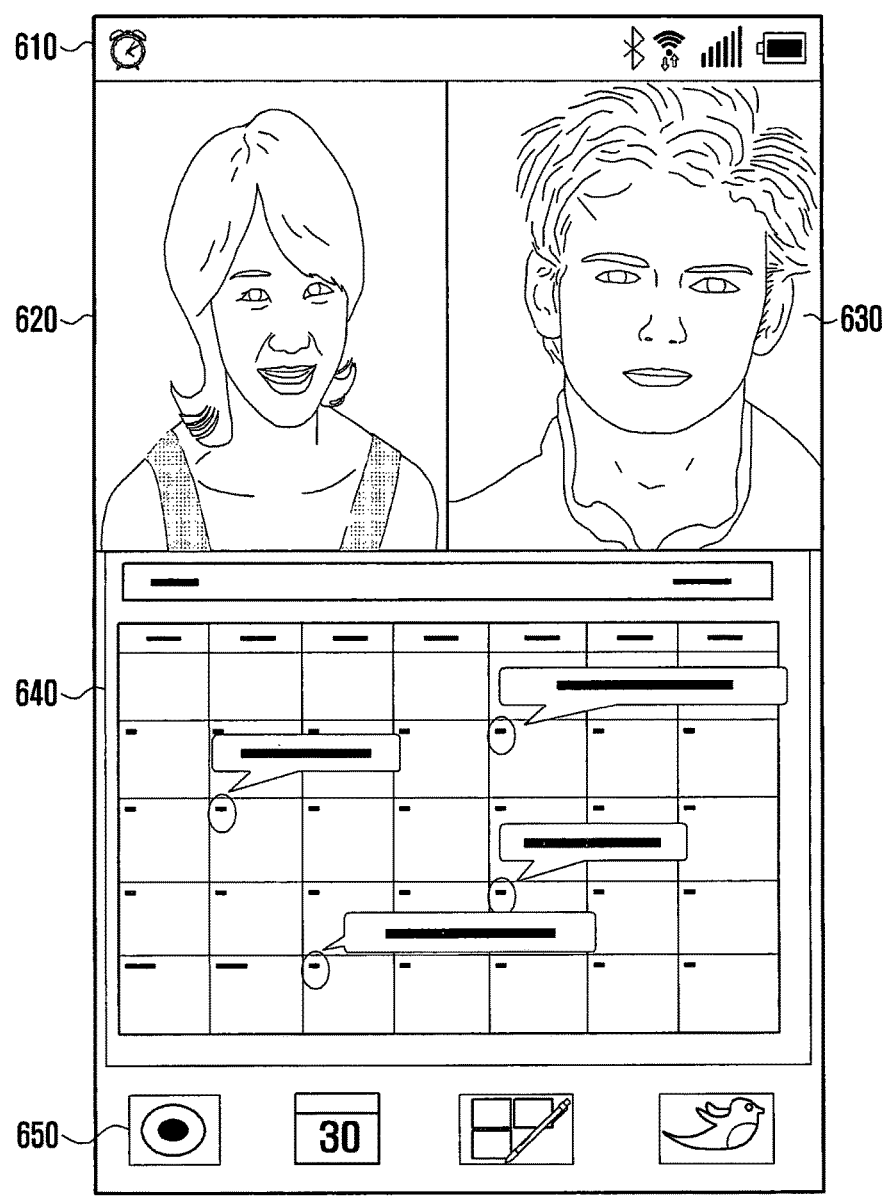
FIG. 6 illustrates a counterpart-associated information providing screen according to a third embodiment of the present invention.

FIG. 6 illustrates a counterpart-associated information providing screen according to a third embodiment of the present invention.

As shown in FIG. 6, in the third embodiment, a call connection screen 610 may be configured to output information associated with a counterpart of a video call in progress. Here, the call connection screen 610 may be output on the display unit 120 when a call is in progress after establishment of a communication channel to a specific counterpart terminal. A video call is depicted in the drawing but the embodiment is not limited to a video call.

The call connection screen 610 may include a user image region 620, a counterpart image region 630, a counterpart information window 640, and information selection items 650. The user image region 620 is a region in which an image captured by the camera module is output. The counterpart image region 630 is a region in which a counterpart image received from the counterpart is output. The counterpart information window 640 and the information selection item 650 are described in connection with FIG. 3, and a description thereof is omitted.

As shown in FIGS. 3 and 4, the mobile terminal 100 may provide counterpart-associated information on the screen not only during a call waiting state but also after call establishment. Hence, the user may browse or examine counterpart-associated information anytime during a call.

In addition, when the user wishes to share a piece of counterpart-associated information with the counterpart during a video call, the user may cause the mobile terminal 100 to send page information output on the counterpart information window to the counterpart terminal.

Figure 7:
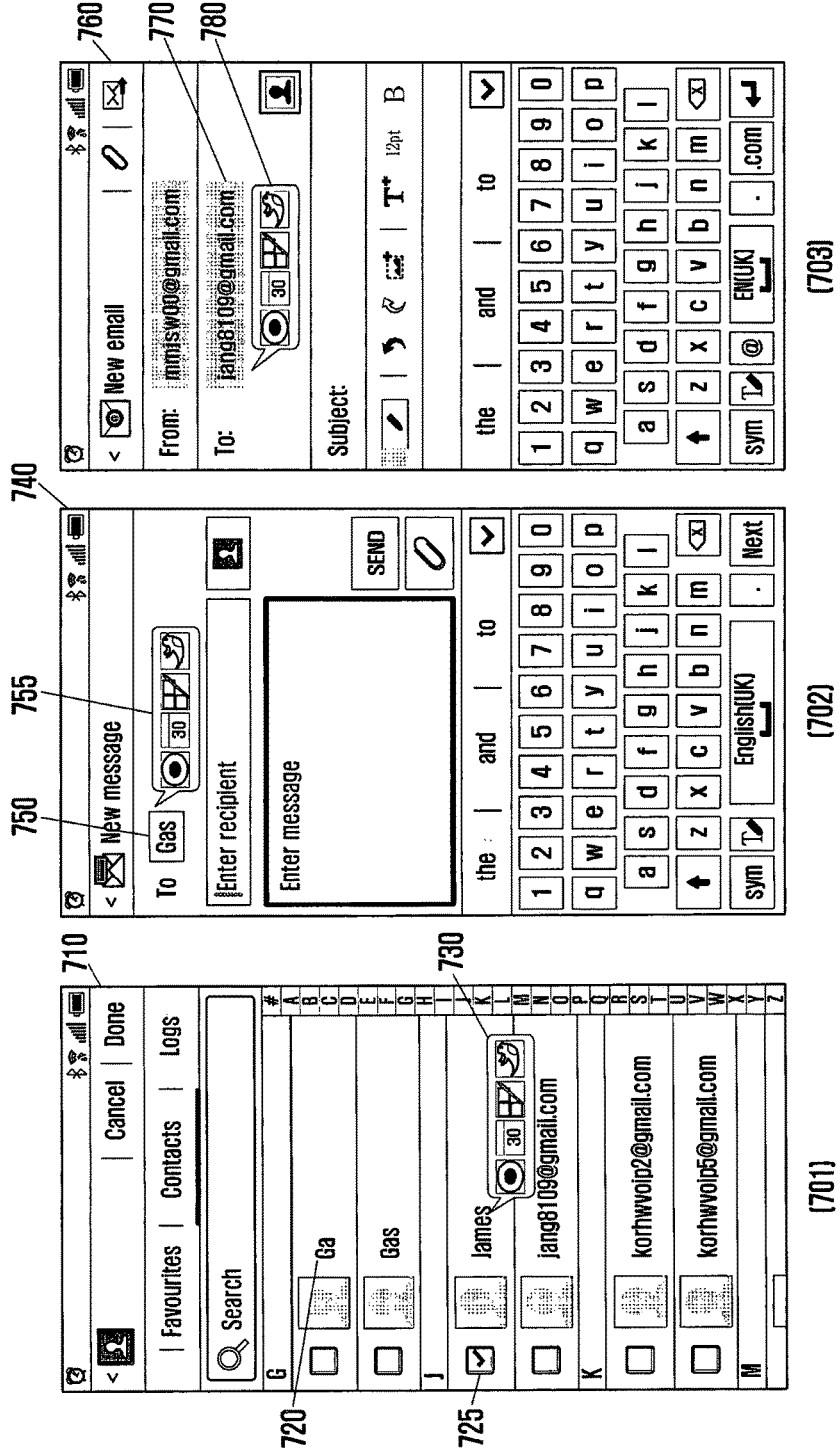
FIG. 7 illustrates counterpart-associated information providing screens according to a fourth embodiment of the present invention.

FIG. 7 illustrates counterpart-associated information providing screens according to a fourth embodiment of the present invention.

Referring to FIG. 7, in the fourth embodiment, the mobile terminal 100 may output an information selection item linked with counterpart-associated information at a counterpart ID field.

For example, as indicated by indicia 701, counterpart IDs 720 may be displayed on a contacts list screen 710. When the user selects a counterpart ID 725, the mobile terminal 100 may output information selection items 730 to provide information associated with the counterpart ID 725. Here, the information selection items 730 may include at least one of a video log icon linked with video log information, a schedule icon linked with schedule information, a voice keyword icon linked with voice information, and a social icon linked with social content for the corresponding counterpart. Thereafter, when the user selects one of the information selection items 730, the mobile terminal 100 may output a page mapped with the selected information selection item on the screen.

Indicia 702 indicates output of information selection items 755 in response to selection of a recipient ID 750 on a message composition screen 740. Indicia 703 indicates output of information selection items 780 in response to selection of a recipient ID 770 at the recipient field of an email writing screen 760. As indicated by indicia 702 and 703, when a specific recipient is selected according to user input, the mobile terminal 100 may output information selection items to provide information associated with the selected recipient. Hence, the user may view and refer to information associated with the recipient while composing a message or email message. This may help the user to maintain continuity of memory and to feel a sense of closeness with the recipient.

Figure 8:
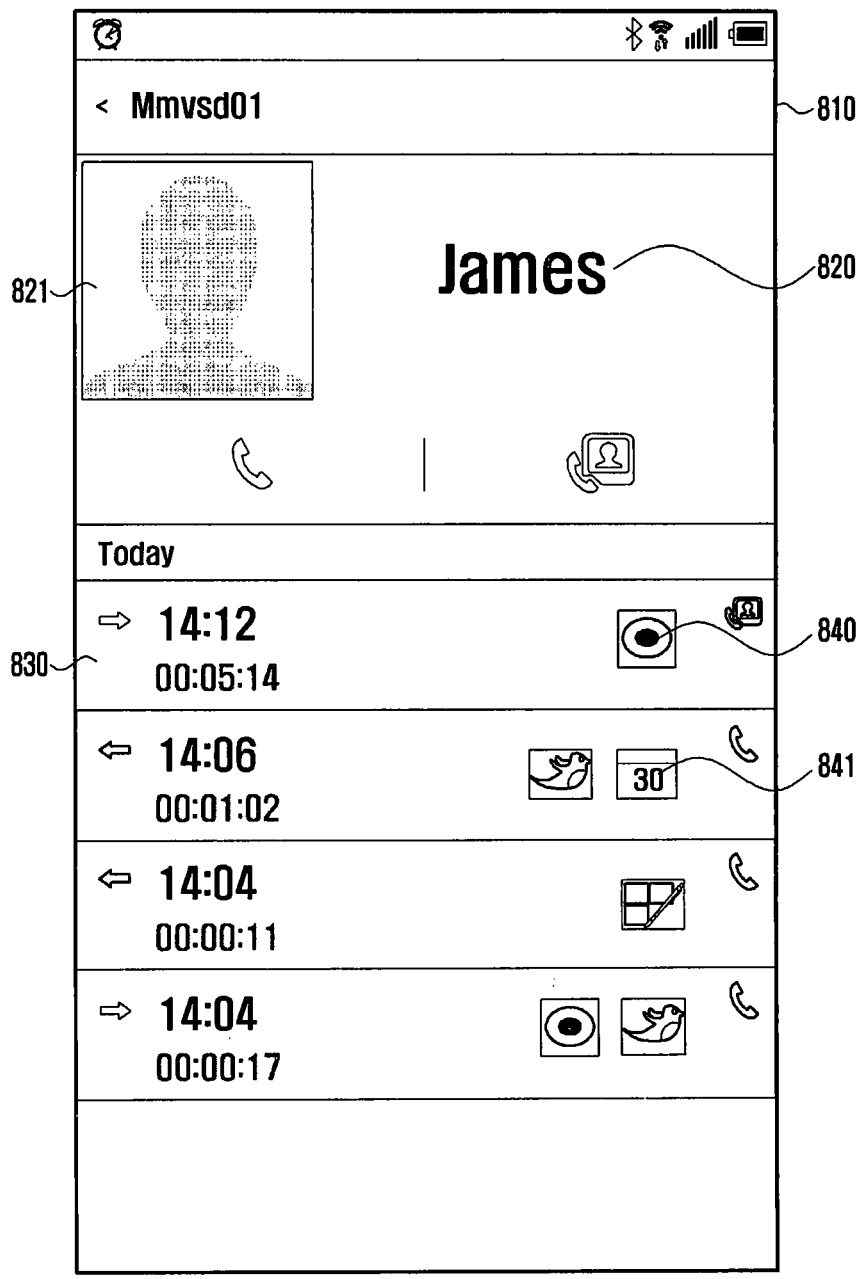
FIG. 8 illustrates a counterpart-associated information providing screen according to a fifth embodiment of the present invention.

FIG. 8 illustrates a counterpart-associated information providing screen according to a fifth embodiment of the present invention.

Referring to FIG. 8, in the fifth embodiment, the mobile terminal 100 may update counterpart-associated information displayed on a call log screen 810 related to a specific counterpart. For example, the call log screen 810 may include a counterpart ID 820, a counterpart image region 821, and call log entries 830. Here, the call log entries 830 may be listed in reverse chronological order. The mobile terminal 100 may provide updated counterpart-associated information collected at the time of call establishment through the call log screen 810. The user may be aware of update made to counterpart-associated information through the call log screen 810. For example, the user may be aware of update made to the video log information 840 in relation to a call with a counterpart "james" at 14:12, and of update made to the schedule information 841 at 14:06. When the user selects a corresponding icon to view updated information, the mobile terminal 100 may output an information page mapped with the icon on the screen.

As described above, the mobile terminal 100 may display updates made to counterpart-associated information in chronological order on a call log screen, and provide video log information, schedule information, voice information recognized during a call, or content information in more detail in relation to a specific counterpart.

Figure 9:
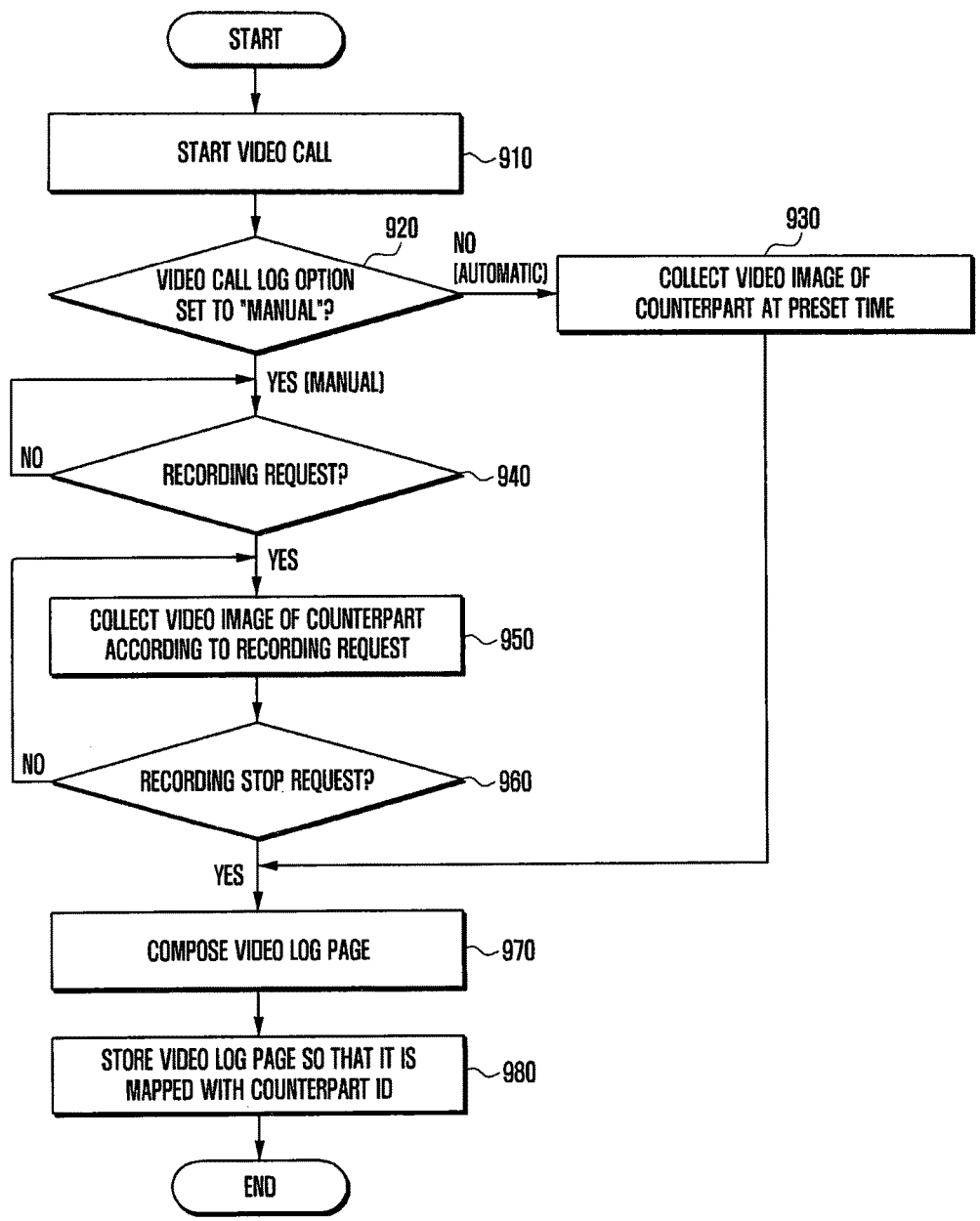
FIG. 9 is a flowchart of a procedure for collecting log information on video calls according to an embodiment of the present invention.

FIG. 9 is a flowchart of a procedure for collecting log information on video calls according to an embodiment of the present invention.

Referring to FIG. 9, at step 910, the mobile terminal 100 starts a video call with a counterpart terminal. Specifically, the mobile terminal 100 may place a video call to the counterpart terminal and receive a response signal indicating acceptance of the call. Or, the mobile terminal 100 may receive a video call from the counterpart terminal and accept the call. Then, the video call is established between the mobile terminal 100 and the counterpart terminal.

At step 920, the mobile terminal 100 checks whether the video call log option is set to "manual". The mobile terminal 100 may provide a menu for configuring options for collecting video call log information. The video call log option may be set to "manual" or "automatic" by default at the time of manufacture and may be changed later according to user input. For example, when the video call log option is set to "automatic", video recording may start at the time of call initiation and end at the time of call termination. However, the user may also configure recording parameters such as start times, end times, and recording intervals.

If the video call log option is set to "manual", at step 940, the mobile terminal 100 checks whether a recording request is issued. For example, during the video call, when the user discusses an important issue with the counterpart or has to record the conversation, the user may enter an input signal to start recording. Such a recording request may be issued by, for example, touching a record on/off menu item of the video call screen or pressing a preset button (e.g. side key during video call).

If a recording request is detected, at step 950, the mobile terminal 100 collects video image data and voice data received from the counterpart according to the recording request. At step 960, the mobile terminal 100 checks whether a recording stop request is issued. If a recording stop request is detected, at step 970, the mobile terminal 100 composes a video log page on the basis of the collected video image data and voice data. For example, the mobile terminal 100 may process the collected video image data and voice data (e.g. resizing) to compose screen data. When multiple video log images of the counterpart are collected, the mobile terminal 100 may arrange the collected video log images in reverse chronological order so that the most recent video log image is output on the screen. At step 980, the mobile terminal 100 stores the video log page so that the video log page is mapped with the ID of the counterpart.

If the video call log option is set to "automatic" at step 920, at step 930, the mobile terminal 100 collects video image data and voice data received from the counterpart for a time duration according to preset settings. Thereafter, the procedure proceeds to step 970.

Figure 10:
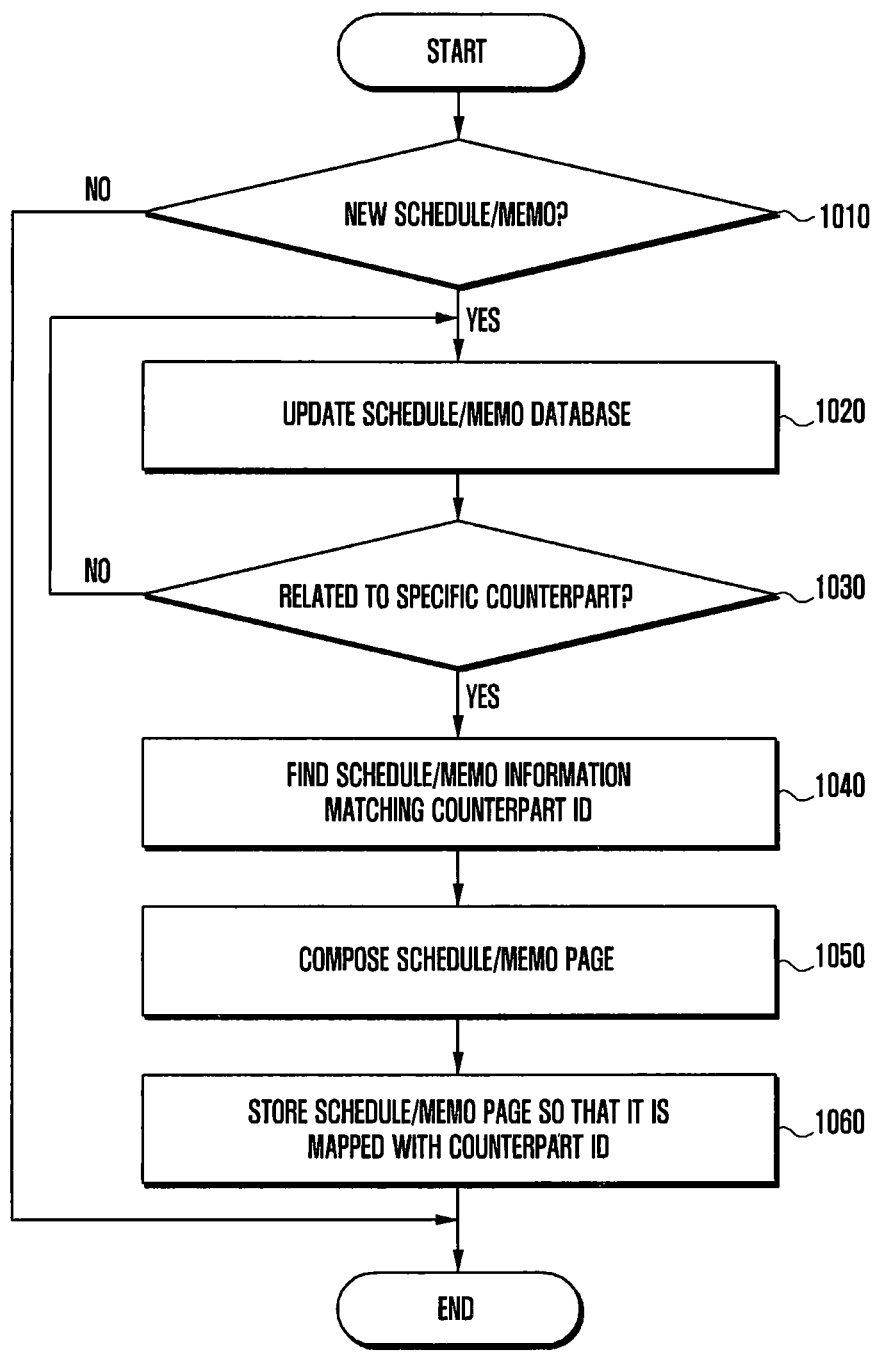
FIG. 10 is a flowchart of a procedure for collecting information on schedules and memos according to an embodiment of the present invention.

FIG. 10 is a flowchart of a procedure for collecting information on schedules and memos according to an embodiment of the present invention.

Referring to FIG. 2, at step 1010, the mobile terminal 100 checks whether a new schedule/memo is created during activation of the schedule/memo function. If a new schedule/memo is created, at step 1020, the mobile terminal 100 updates the schedule/memo database. At step 1030, the mobile terminal 100 checks whether the new schedule/memo is related to a specific counterpart. Specifically, the mobile terminal 100 may compare the contents of the new schedule/memo with the contacts database to check whether a common text string is present. If a common text string is present, the mobile terminal 100 may determine that the new schedule/memo is related to a counterpart ID enrolled in the contacts database. For example, when the user creates a memo "meet Honggildong 9:00 Kangnam station" and a string "Honggildong" is present in the contacts database, the mobile terminal 100 may determine that the memo is related to a counterpart ID "Honggildong".

If the new schedule/memo is related to a specific counterpart, at step 1040, the mobile terminal 100 collects schedule/memo information containing the counterpart ID. At step 1050, the mobile terminal 100 composes a schedule/memo page to be output on the basis of the collected schedule/memo information. At step 1060, the mobile terminal 100 stores the schedule/memo page so that the schedule/memo page is mapped with the counterpart ID.

Figure 11:
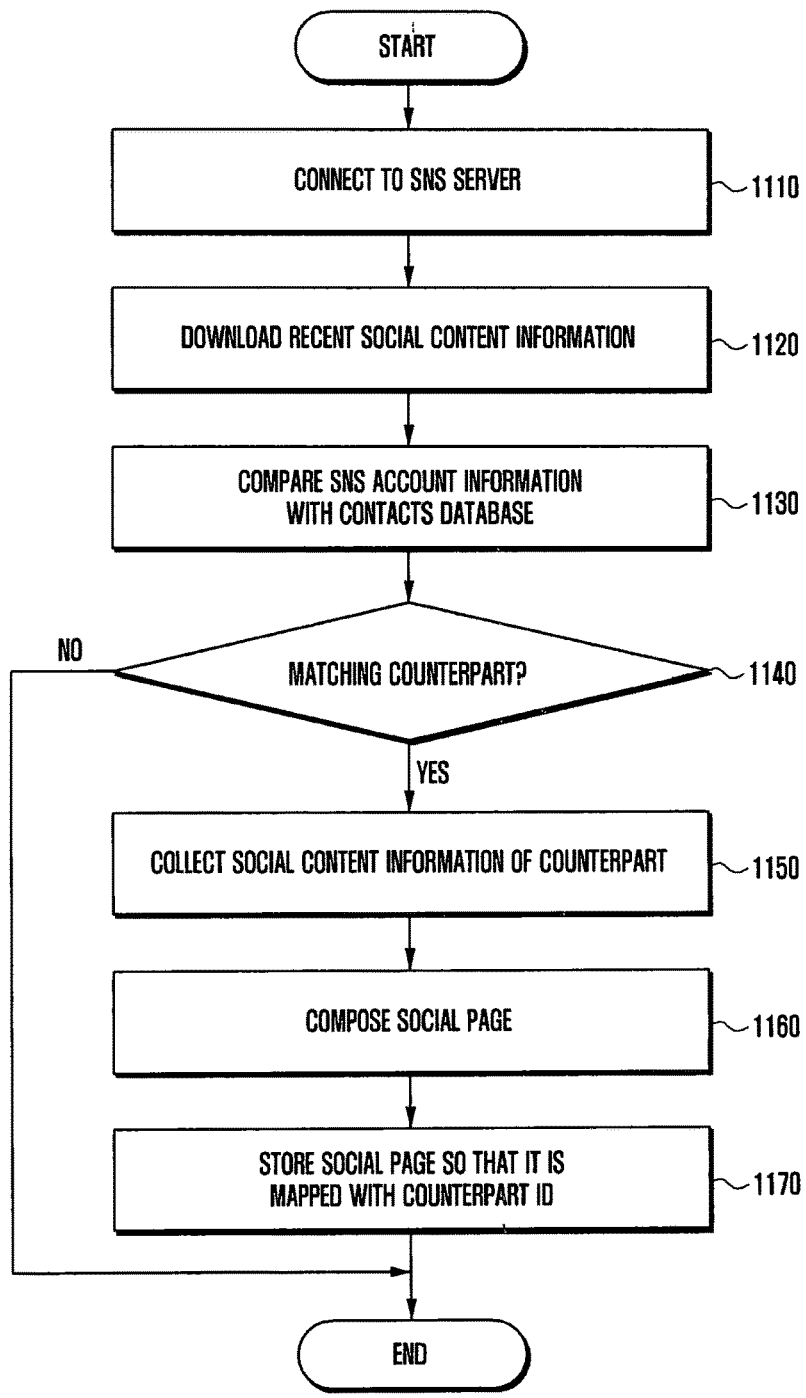
FIG. 11 is a flowchart of a procedure for collecting social content information according to an embodiment of the present invention.

FIG. 11 is a flowchart of a procedure for collecting social content information according to an embodiment of the present invention.

Referring to FIG. 11, at step 1110, the mobile terminal 100 connects to an SNS server according to a preset schedule or user request. Specifically, the mobile terminal 100 may send a connection request message to the SNS server using address information (e.g. URL or IP) of the SNS server. The SNS server may perform authentication of the mobile terminal 100 (e.g. examine account ID and password) and accept the connection request if authentication is successful.

At step 1120, the mobile terminal 100 downloads recent content information from the SNS server. At step 1130, the mobile terminal 100 compares SNS account information with the contacts database. At step 1140, the mobile terminal 100 checks whether the SNS account information matches a counterpart ID enrolled in the contacts database. If the SNS account information matches an enrolled counterpart ID, at step 1150, the mobile terminal 100 collects social content information of the matching counterpart. For example, the mobile terminal 100 may collect social content information posted by the counterpart or collect SNS messages sent to or received from the counterpart terminal. Here, when the SNS account information matches multiple enrolled counterpart IDs, the mobile terminal 100 may collect social content information for each counterpart ID.

At step 1160, the mobile terminal 100 composes a social page by arranging the collected social content information according to a preset rule or in chronological order. At step 1170, the mobile terminal 100 stores the social page so that the social page is mapped with the matching counterpart ID.

Figure 12:
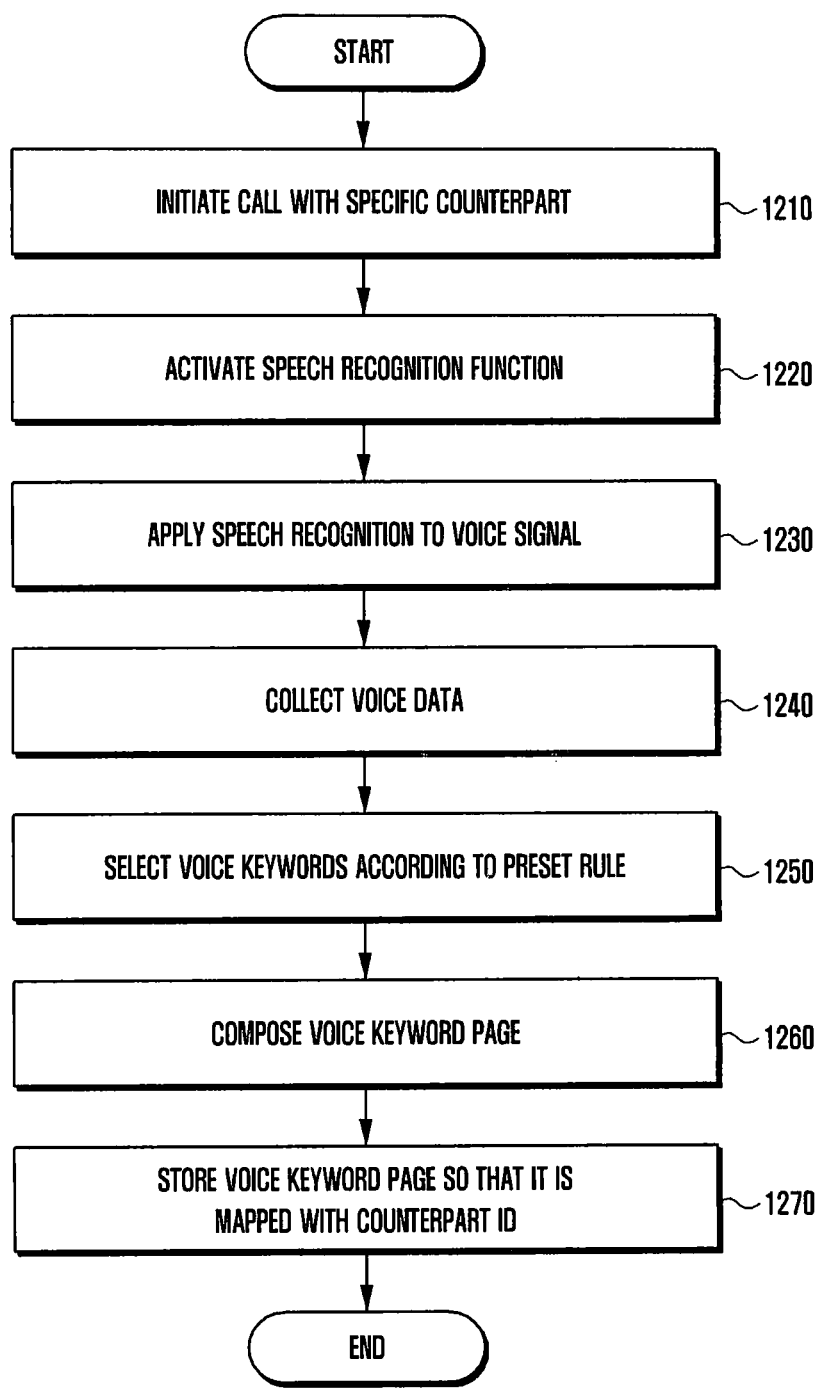
FIG. 12 is a flowchart of a procedure for collecting voice information according to an embodiment of the present invention.

FIG. 12 is a flowchart of a procedure for collecting voice information according to an embodiment of the present invention.

Referring to FIG. 12, at step 1210, the mobile terminal 100 initiates a voice call or video call with a counterpart terminal. After call initiation, at step 1220, the mobile terminal 100 activates a speech recognition function. At step 1230, the mobile terminal 100 applies speech recognition to the conversation between the user and the counterpart during the call. At step 1240, the mobile terminal 100 collects voice data on the basis of speech recognition results. For example, voice signals of the user and counterpart may be converted into digital signals through a codec, and voice data may be extracted from the digital signals from the codec. Frequency analysis using Fast Fourier Transform (FFT) or waveform analysis may be applied to generate voice data. In addition, various noise removal algorithms may be applied to remove noise from the voice data.

At step 1250, the mobile terminal 100 selects voice keywords using the voice data according to a preset rule. For example, the mobile terminal 100 may identify keywords repeated in the voice data of the user and the counterpart and selects voice keywords in order of frequency.

At step 1260, the mobile terminal 100 composes a voice keyword page on the basis of the selected voice keywords. Here, the selected voice keywords may be converted into text data through speech-to-text (STT) and the voice keyword page may be composed using the text data. At step 1270, the mobile terminal 100 stores the voice keyword page so that the voice keyword page is mapped with the ID of the counterpart.

As described hereinabove, the mobile terminal of the present invention may collect information associated with a counterpart, compose a page for screen output using the collected information, and store the page so that the page is mapped with the counterpart ID. Later, when counterpart-associated information is necessary, the mobile terminal may find a page mapped with a desired counterpart ID and output the found page on the screen.

Exemplary embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

The invention claimed is:

1. A method for displaying associated information in an electronic device, the method comprising:
   executing a communicating application which is able to communicate with at least one counterpart;
   selecting the at least one counterpart to communicate with in the communicating application;
   identifying, based on the selection, information associated with the selected at least one counterpart, wherein at least part of the information is generated by applications different from the communicating application; and
   displaying the at least part of the identified information prior to initiating communication with the selected at least one counterpart, using the communicating application,
   wherein the information comprises at least one of communication log information for a video or voice call with a counterpart, schedule or memo information related to the counterpart, voice information collected during a call with the counterpart, and social content information related to the counterpart, and
   wherein the displaying of the at least part of the identified information comprises displaying at least one menu item generated corresponding to the at least part of the identified information.

2. The method of claim 1, wherein displaying the information associated with the selected at least one counterpart comprises displaying at least one of a page composed of communication log information, a page composed of schedule or memo information, a page composed of voice information, and a page composed of social content information.

3. The method of claim 2, wherein
   in response to selection of the at least one menu item, displaying information corresponding to the selected menu item.

4. The method of claim 1, wherein the communicating application comprises at least one of a voice call application, a message application, an email application, a contact application, and a social networking service (SNS) application.

5. The method of claim 3, wherein the at least one menu item comprises an object indicating a communication log information, an object indicating a schedule or memo information, an object indicating a voice information, and an object indicating a social content information.

6. The method of claim 1, further comprising, before identifying the information:
   collecting video images and voice data during a video call with the selected at least one counterpart according to a preset schedule or user input;
   composing a communication log page on the basis of the collected information; and
   storing the communication log page so that the communication log page is mapped with identification information of the selected at least one counterpart.

7. The method of claim 1, further comprising, before identifying the information:
   activating a speech recognition function during a voice or video call with the selected at least one counterpart;
   collecting voice data of the user and the selected at least one counterpart using the speech recognition function;
   selecting voice keywords from the voice data according to a preset rule;
   composing a voice information page by arranging the selected voice keywords in chronological order; and
   storing the voice information page so that the voice information page is mapped with the identification information of the selected at least one counterpart.

8. The method of claim 1, further comprising, before identifying the information:
   searching for schedules or memos matching identification information of the selected at least one counterpart;
   composing a schedule or memo page by organizing the found schedules or memos on a weekly or monthly basis; and
   storing the schedule or memo page so that the schedule or memo page is mapped with the identification information of the selected at least one counterpart.

9. The method of claim 1, further comprising, before identifying the information:
   collecting social content data of the selected at least one counterpart by comparing SNS account information with a contacts database;
   composing a social content page by arranging the collected social content data in chronological order; and
   storing the social content page so that the social content page is mapped with the identification information of the selected at least one counterpart.

10. An electronic device comprising:
    a display configured to output a function processing screen of the electronic device;
    a controller configured to control:
      collecting at least one of communication log information related to at least one counterpart, schedule or memo information related to the at least one counterpart, voice information during a call with the at least one counterpart, and social content information related to the at least one counterpart,
      executing a communicating application which is able to communicate with the at least one counterpart,
      selecting the at least one counterpart to communicate with in the communicating application,
      identifying, based on the selection, information associated with the selected at least one counterpart, wherein at least part of the information is generated by applications different from the communicating application, and
      displaying the at least part of the identified information prior to initiating communication with the selected at least one counterpart, using the communicating application, on the display, wherein the displaying of the at least part of the identified information comprises displaying at least one menu item generated corresponding to the at least part of the identified information; and
    a memory configured to store information mapped with identification information of a counterpart so that the information is associated with identification information of the selected at least one counterpart.

11. The electronic device of claim 10, wherein the controller is further configured to control:
    composing at least one information page to be displayed using the collected information, displaying at least one menu item generated corresponding to each of the identified information, displaying the information page on the display, and displaying, in response to a page change event, an information page different from the currently displayed information page.

12. The electronic device of claim 10, wherein the communicating application comprises at least one of a voice call application, a message application, an email application, a contact application, and a social networking service (SNS) application.

13. The electronic device of claim 10, wherein at least one menu item comprises at least one of an object indicating a communication log information, an object indicating a schedule or memo information, an object indicating a voice information, and an object indicating a social content information.

14. The electronic device of claim 10, wherein the controller is further configured to collect video images and voice data during a video call with the selected at least one counterpart according to a preset schedule or user input, and compose a video log page on the basis of the collected information so that the most recent image and voice data are output first.

15. The electronic device of claim 10, wherein the controller is further configured to activate a speech recognition function during a voice or video call with the selected at least one counterpart, collect voice data of the user and the selected at least one counterpart using the speech recognition function, select voice keywords from the voice data according to a preset rule, and compose a voice information page by arranging the selected voice keywords in chronological order.

16. The electronic device of claim 10, wherein the controller is further configured to search for schedules or memos matching the identification information of the selected at least one counterpart, and compose a schedule or memo page by organizing the found schedules or memos on a weekly or monthly basis.

17. The electronic device of claim 10, wherein the controller is further configured to collect social content data of the selected at least one counterpart by comparing SNS account information with a contacts database, and compose a social content page by arranging the collected social content data in chronological order.

* * * * *